United States Patent [19]

McClellan

[11] Patent Number: 4,903,782
[45] Date of Patent: Feb. 27, 1990

[54] LEVEE SQUEEZER

[76] Inventor: Timothy V. McClellan, P.O. Box 212, Hwy. 97, Kingsland, Ark. 71652

[21] Appl. No.: 369,066

[22] Filed: Jun. 20, 1989

[51] Int. Cl.$^4$ .................. A01B 13/02; A01B 49/02
[52] U.S. Cl. .................. 172/799.5; 172/140; 172/195; 172/466; 172/677
[58] Field of Search .............. 172/140, 193, 194, 195, 172/197, 199, 202, 272, 466, 468, 470, 677, 701, 776, 799.5

[56] References Cited

U.S. PATENT DOCUMENTS

| | | | |
|---|---|---|---|
| 340,345 | 4/1886 | Minnich | 172/195 |
| 2,644,252 | 7/1953 | Brown | 172/421 |
| 2,733,646 | 2/1956 | Sheffield | 172/195 |
| 2,739,396 | 3/1956 | Frenzel | 172/701 X |
| 3,126,655 | 3/1964 | Fischer | 172/677 |
| 3,454,104 | 7/1969 | Fuchs | 172/176 |
| 3,566,974 | 3/1971 | Kopaska | 172/202 |
| 3,643,745 | 2/1972 | Betulius et al. | 172/466 X |
| 4,291,770 | 9/1981 | Engler | 172/185 |
| 4,506,741 | 3/1985 | Hula, Jr. | 172/448 X |
| 4,618,004 | 10/1986 | Howard | 172/199 X |
| 4,625,989 | 12/1986 | Allen et al. | 172/272 |
| 4,721,167 | 1/1988 | Salley et al. | 172/677 X |

FOREIGN PATENT DOCUMENTS 570933  1/1924  France .................. 172/140

OTHER PUBLICATIONS

"Three Point Hitch or Pull-Type Levee Squeezer", Sales Brochure, Gould Mfg. Co., Dec. 1983.

*Primary Examiner*—Randolph A. Reese
*Assistant Examiner*—Jeffrey L. Thompson
*Attorney, Agent, or Firm*—Stephen D. Carver

[57] ABSTRACT

A levee cutting and forming implement for rice farming which prevents the construction of unwanted bar ditches or ruts. A rigid, generally angularly rearwardly diverging frame supports a pair of rigid, ground engaging levee cutting blades. The elongated cutting blades form a wide mouth at the front of the frame, and converge beneath the frame to a rear levee output. A tine control system comprising a plurality of rigid downwardly projecting Danish tines is employed during the levee cutting process to smooth over the channels adjacent the levee to prevent the formation of bar ditches. The tine system comprises a pair of spaced-apart tine bars from which a plurality of resilient Danish tines project downwardly. A transverse tine control axle journaled for rotation is transversely mounted beneath the frame, and it is controlled by a hydraulic cylinder. A pair of outwardly extending, rearwardly angularly diverging tine control struts emanate from the tine control axle and mount the rear tine control bars. The tine bars may thus be hydraulically moved upwardly or downwardly at the rear of the implement during levee forming passes. The associated wheel system may be hydraulically deployed in either a transport position or a clearance position for levee formation. Preferably the wheel and tine system hydraulic cylinders are coplanar.

14 Claims, 5 Drawing Sheets

FIG. 14
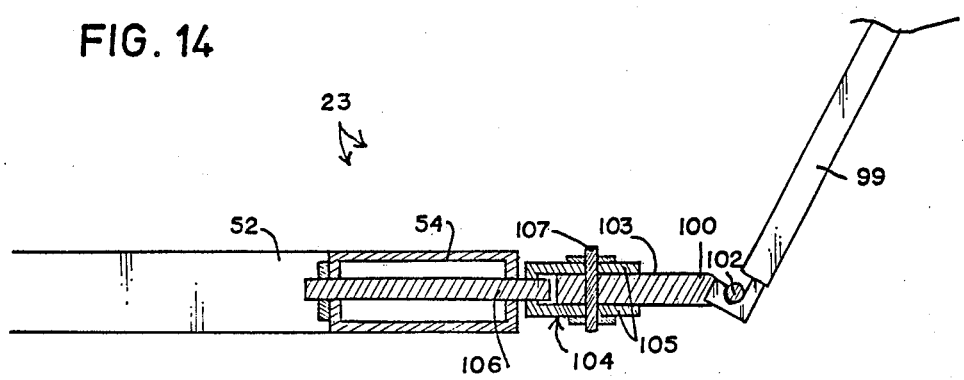
FIG. 15
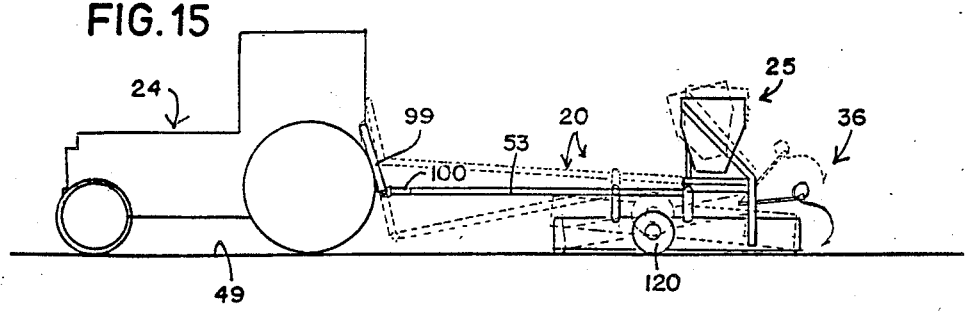
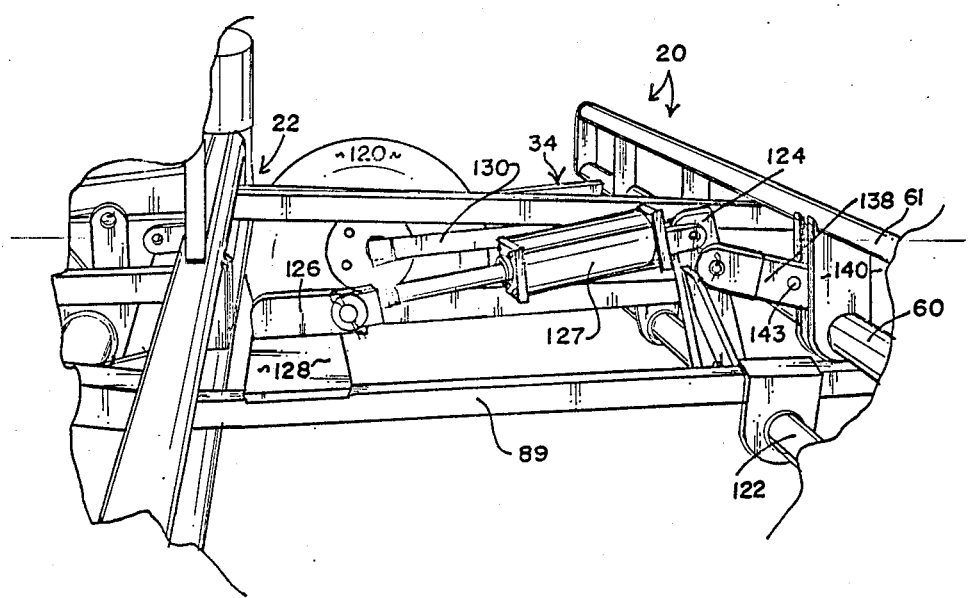
FIG. 13

LEVEE SQUEEZER

BACKGROUND OF THE INVENTION

The present invention relates generally to agricultural ground working implements for rice farming. More particularly, the present invention is directed to a levee cutting and forming implement which prevents the formation of bar ditches.

As will be recognized by those skilled in the rice farming arts, it is extremely important to properly build an effective levee prior to flooding. Rice farms may encompass a wide variety of different soils, such as gumbo mud soils, sandy soils, rich loam soils and combinations thereof. In exceedingly heavy gumbo or clay soils it is typically the case that three to five passes over the proposed levee must me made by conventional known levee equipment. The last pass is to seed the levee, since planting it enhances its strength. While it is known to provide a towable apparatus including a pair of angularly disposed lower blades, known levee forming equipment suffers from numerous disadvantages.

First, with soils of different hardnesses and characteristics, conventional equipment requires too many passes. Also, prior art implements typically require laborious and tedious manual adjustments of various parts. Such equipment usually must be manually adjusted for ideal results when operating in soils of different characteristics. For example, when known prior art levee cutters are used in extremely gumbo areas, tedious manual adjustments must be made before moving to loam or sandy soil. Obvious disadvantages result when the farmer must prepare fields which have differing soil characteristics.

The primary disadvantage of known prior art levee forming equipment is that conventional devices form deep and angle levee ruts, which are also known as bar ditches. The unwanted bar ditches are typically formed in parallel rows on both sides of the levee. For extremely viscous or gumbo soils which necessitate multiple passes, the bar ditches can be quite pronounced and angled. While these ditches do not hamper successful planting and growing of rice, they can deleteriously interfere with harvesting. During the rice harvesting operation the combine must drive over the levees, and the combine crosses the levee and the bar ditches at an angle. Because of the angles assumed by the combine when negotiating a levee, and the attendant stresses, structural damage can occur.

It is not uncommon for a combine to break an axle when traversing a conventional levee. Axle repairs typically run in the neighborhood of three thousand dollars, and repairs take valuable time during the critical harvesting season. The first step during rice harvesting is to drain the fields, after which the continually-changing moisture content of the grain in the field is monitored. When a desirable moisture content is reached, the harvest must progress immediately, because optimum moisture content enhances the grain price. Also, typical crop insurance terminates at the harvest season, but other insurance may cover the transport period, which begins when the combine first cuts the crop. That period of time after the start of the harvest, but before delivery to the mill or storage facilities, exposes the farmer to possible uninsured losses aggravated when the combine breaks down.

Since bar ditches aggravate combine stresses, it is desirable to use levees which have not bar ditches. In other words, it is desirable to provide a levee forming implement which prevents the generation of a deep or irregular bar ditch on either side of the levee.

Rice levee cutting equipment is seen in such patents as Brown, issued July 7, 1953, U.S. Pat. No. 2,644,252. Fuchs U.S. Pat. No. 3,454,104, Issued July 9, 1969 can also form a rice levee, and numerous other apparatus has been proposed. Disks can be employed to form levees as indicated in Engler U.S. Pat. No. 4,291,770, Issued Sept. 29, 1981. A levee rice gate cutter implement is seen in U.S. Pat. No. 4,506,741, Issued Mar. 26, 1985 to Hula, Jr.

SUMMARY OF THE INVENTION

The levee squeezer disclosed herein comprises an earthworking farm implement for forming rice levees without adjacent bar ditches. The levee squeezing implement may be towed to the field with a pickup truck, and then quickly connected to a conventional tractor for earth working. Control is effected hydraulically without repetitive manual adjustments.

The implement comprises a rigid frame formed of a plurality of rigid, interconnected structural braces. Substantially "V-shaped" members intersecting a plurality of spaced-apart horizontal frame members form a generally planar frame which supports a pair of lower, generally converging levee cutting blades. A tow bar is coupled to the frame front for attaching the apparatus to the "quick connect-disconnect" tow apparatus of the tractor or other tow vehicle. A supporting wheel system is hydraulically switched between an out-of-the-way field deployment and a ground contacting implement transporting position. The tow bar may be swiveled 360 degrees relative to the longitudinal axis of the frame, and in addition, it may be pivoted side-to-side. Thus the tow bar freely moves to accommodate tractor movements during operation. However, the tow bar is not permitted to swivel up and down. As a result, the tractor's hydraulics may be used to force the implement into different angles of attack when necessary to accommodate varying field conditions, since the tow bar cannot pivot in an up and down direction.

The levee forming blades secured beneath the frame extend in a "V" configuration to form a wide mouth at the front bottom of the frame and converge in at a narrower levee discharge output beneath the frame rear. A tine system is employed to control the levee ruts which might otherwise be created at the rear of the blades. The tine system is concurrently deployed during levee cutting to prevent levee bar ditches from forming, and it is controlled hydraulically. The tine system prevents the generation of bar ditches on either side of the levee.

The tine system comprises a pair of spaced-apart tine bars equipped with numerous downwardly projecting, resilient Danish tines which are forced into the ground during levee construction. A transverse tine control axle is journaled to the frame, and it is mounted generally transversely with respect to the longitudinal axis of the frame. A pair of tine bar struts extend angularly rearwardly from the tine control axle at opposite ends thereof, and support the tine bars. The hydraulic control cylinder is coupled between the frame and the transverse tine control axle to force the tine bars into operation by rotating the axle. Stresses are reduced by aligning the hydraulic wheel control cylinder with the hydraulic tine control cylinder.

When the tines are forced downwardly into contact with the ground, sharp ridges adjacent the just-formed levee are modified, as earth is contoured and moved. Because of the depicted angular relationship of the tine bars and the tine control struts, an ideal, rut-free levee contour results. The tines cut into the jagged angular ruts formed by the blades, and redirect dirt into the bar ditches to leave very gentle edges adjacent the levee. Later, during harvesting, for example, combines may drive over levees formed with the instant apparatus without damaging their front axle.

Thus a basic object of the present invention is to provide a levee forming implement for rice farming which does not produce levee ruts or bar ditches.

Another important object is to provide a levee making implement of the character described which creates a reliable rice levee with a minimum of passes.

Thus a related object of the present invention is to provide a rut-preventing levee forming implement of the character described which will create proper levees in a minimum of time.

A still further object is to provide a levee forming implement of the character described which is totally adjustable from a position on the tractor without requiring the use of hand tools, and without requiring the farmer to dismount.

Another object is to provide a levee implement of the character described whose angle of attack may be readily adjusted from the tractor, so that the apparatus will readily accommodate soils of different characteristics.

A still further object is to provide a levee forming implement of the character described which is highly maneuverable and easy to hook to a tractor. It is a feature of the present invention that the tow hitch system readily facilitates versatile field maneuvers.

A related object is to provide a tow system which facilitates quick connection to either a tractor or a pickup truck.

Yet another object is to provide a levee forming apparatus of the character described which may be readily deployed in a transportable position over the highway.

Another object is to provide a levee forming implement which may be conveniently towed to and from the field with a conventional pickup truck using a conventional hitch.

Another object is to provide a levee forming implement which may be readily locked in a transport position.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 13 is an enlarged, fragmentary, perspective view illustrating the preferred wheel control system;

FIG. 14 is an enlarged, fragmentary, diagrammatic view showing the tow hitch construction and, FIG. 15 is a pictorial view showing a typical tractor towing my Levee Squeezer in its transportable position over a relatively smooth road, with moved positions of my Levee Squeezer illustrated in dashed lines;.

DETAILED DESCRIPTION OF THE DRAWINGS

Figure 1:
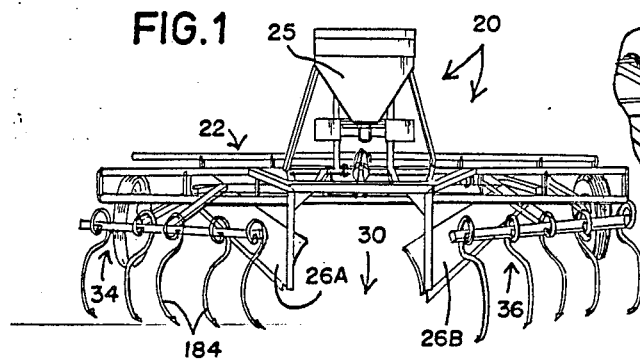
FIG. 1 is a rear perspective view of my Levee Squeezer, showing the best mode known to me.
Figure 9:
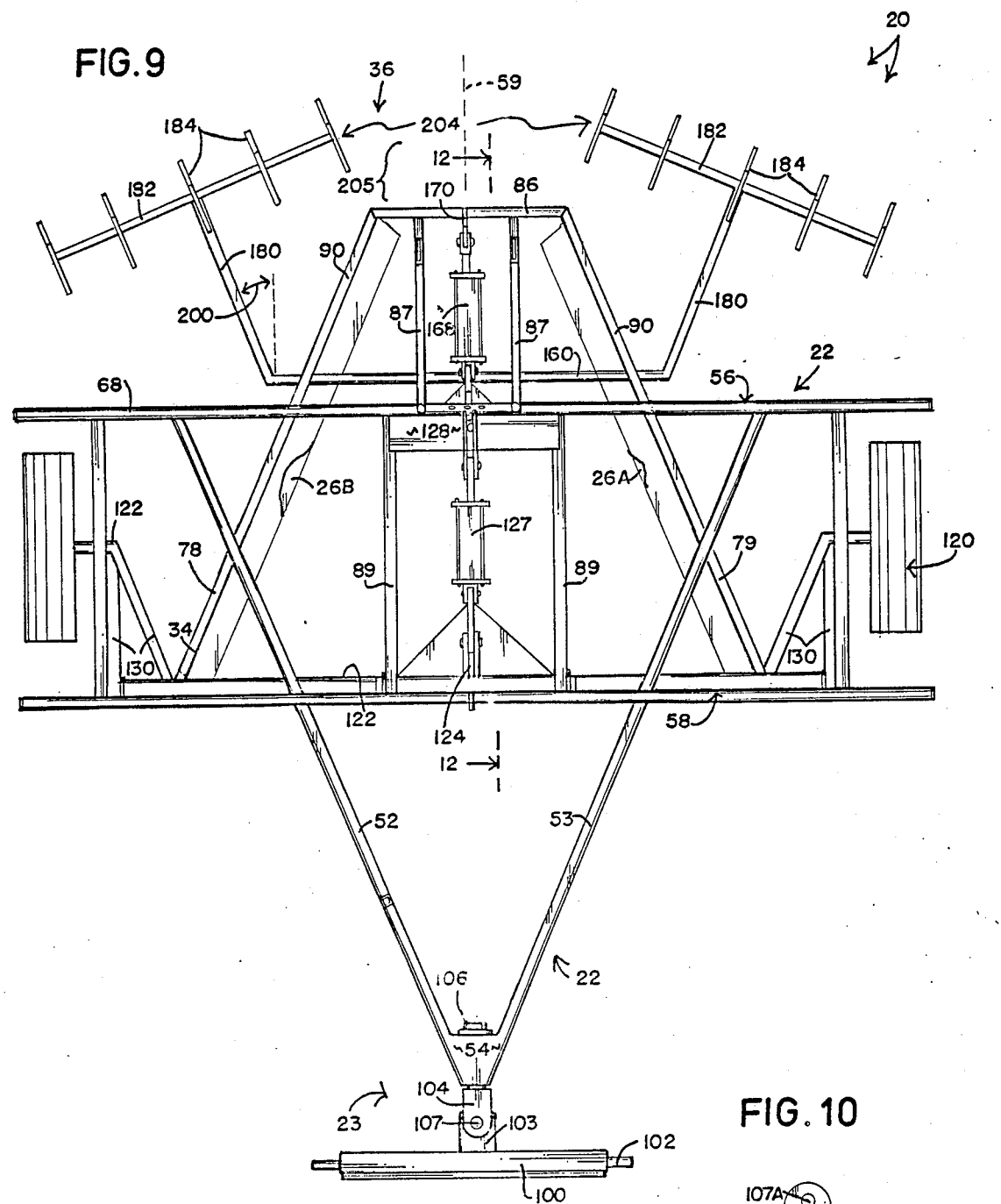
FIG. 9 is an enlarged, fragmentary top plan view of my Levee Squeezer.

With reference now to the appended drawings, a levee squeezer constructed in accordance with the best mode of my invention has been generally designated by the reference numeral 20. Levee squeezer 20 comprises a rigid, multi-piece frame, generally designated by the reference numeral 22, which is associated with a front-mounted tow bar assembly, generally designated by the reference numeral 23. Levee squeezer 20 is controlled by a conventional towing vehicle such as tractor 24 (FIG. 15). As best viewed in FIGS. 1, 6 and 9, the frame supports a pair of lower, elongated and rigid cutting blades 26A and 26B, which are rigidly deployed in a generally "V"-shaped configuration as seen in FIG. 9. At the front of the levee squeezer the blades are relatively spaced apart, so they form a mouth into which raw dirt is forced during operation. At the rear of the frame the blades are relatively close together. In FIG. 1 the implement 20, as it would appear when drawn away from the user, has an output 20. The frame also supports a wheel system generally designated by the reference numeral 34 and a unique tine control system generally designated by the reference numeral 36, both of which will be explained in detail hereinafter. In the best mode the levee squeezer also comprises an elevated planter assembly generally designated by the reference numeral 25, which is centered over the rear of the frame for seeding levees in the normal fashion.

Figure 3:
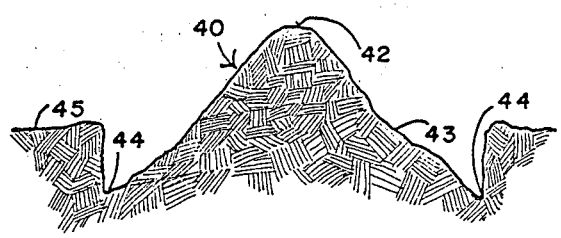
FIG. 3 is a vertical sectional view of a conventional rice levee formed with known prior art levee cutting implements.
Figure 4:
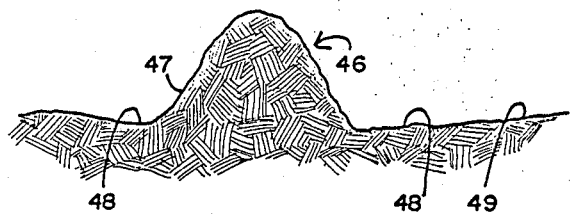
FIG. 4 is a vertical sectional view of a typical rice levee formed with my Levee Squeezer.

With reference primarily directed now to FIGS. 3 and 4, a conventional levee has been generally designated by the reference numeral 40. Levee 40 comprises a peak 42 including descending walls 43 which terminate in jagged, notch-like bar ditches 44 adjacent the flatter portions 45 of the field. The bar ditches 44 can be severely damaging when a tow vehicle or combine later negotiates the levee, and they are reduced if not eliminated with the levee squeezer of the present invention. Thus in FIG. 4 levee 46 has walls 47 terminating in much gentler boundary regions 48 separating the levee 46 from the field 49. My levee squeezer avoids formation of the unwanted bar ditches 44, and the resultant levee 46 may be easily traversed by combines without structural damage.

Figure 5:
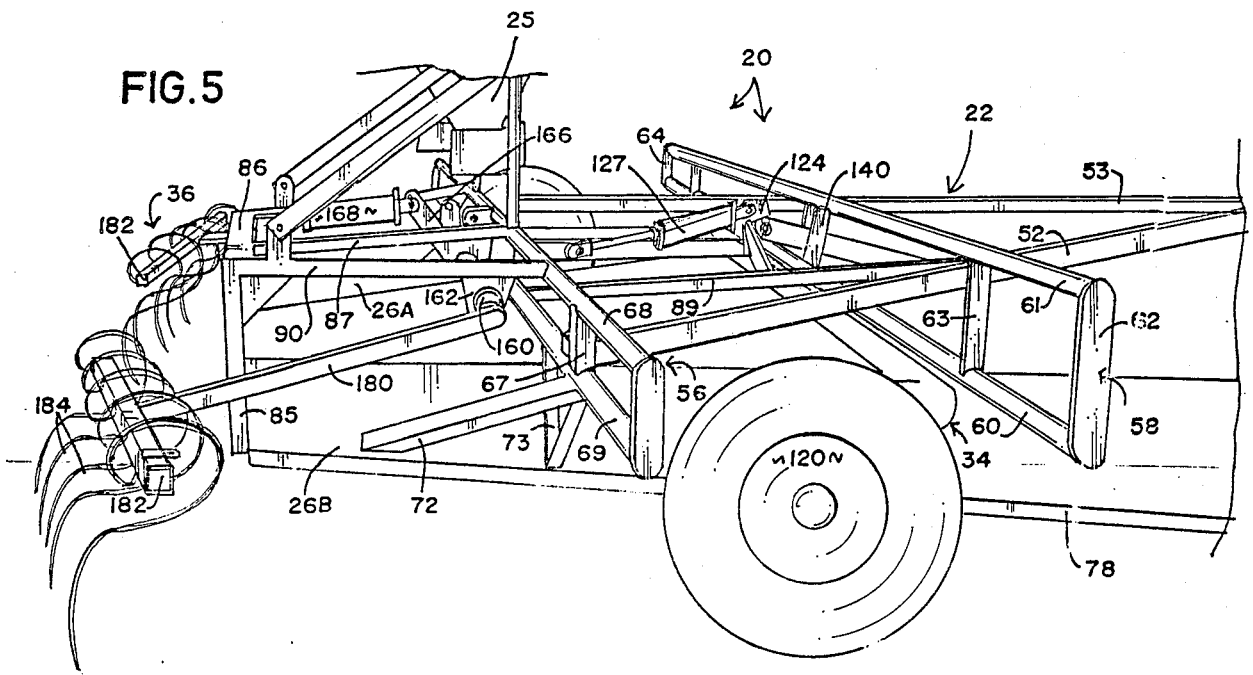
FIG. 5 is a enlarged, fragmentary, rear side perspective view of my Levee Squeezer, with the tine system deployed in a ground engaging position.
Figure 8:
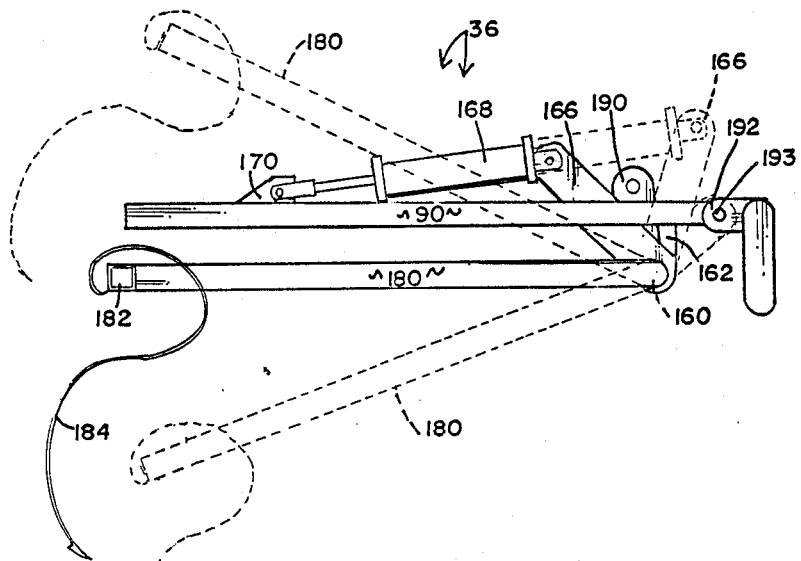
FIG. 8 is an enlarged, fragmentary, diagrammatic view illustrating the preferred tine control system.

With attention now concurrently directed to FIGS. 2, 5, 6 and 9, frame 22 comprises a pair of rigid, diverging rails 52, 53 which extend rearwardly from a front, webbed junction 54 and terminate in a first transverse support strut assembly generally designated by the reference numeral 56 (FIGS. 5, 9). Assembly 56 is spaced-apart from a similar strut assembly 58 also secured to frame rails 52 and 53. The parallel strut assemblies 56 and 58 are similar in construction, and both are centered perpendicularly relative to the longitudinal axis 59 (FIG. 9) of the levee squeezer. Strut assembly 58 comprises elongated, parallel pipes 60 and 61 (FIG. 5) which are spaced apart and reinforced by a plurality of vertical braces 62 through 64. Similarly, strut assembly 56 comprises an upper pipe 68 spaced apart from a lower pipe 69 (FIG. 5) and secured by a plurality of vertical reinforcement braces 67 (FIGS. 5, 9). Pipes 61 and 68 are coplanar and parallel, and they form the top of the frame.

Figure 2:
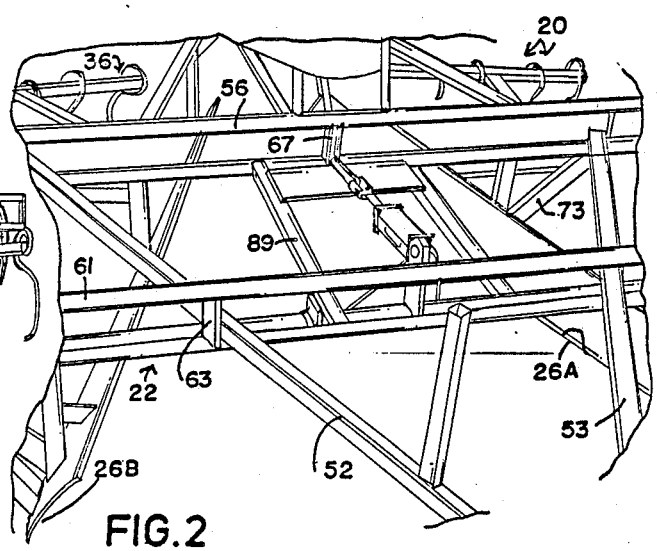
FIG. 2 is an enlarged, fragmentary, front perspective view thereof showing the central region of the frame, with portions thereof broken away or shown in section for clarity, or omitted for brevity.

The lower ground engaging levee-forming blades 26A and 26B previously discussed are secured beneath the frame by suitable strut members 72, 73 (FIGS. 2, 5). Additional blade support is also formed by a pair of spaced-apart rigid angularly rearwardly converging support rails 78, 79 (FIG. 5) which laterally extend from a position immediately ahead of strut assembly 58 and terminate at the lower portion of the rear frame structure generally designated by the reference numeral 80. As is evident from FIGS. 2 and 6, the convex interior of both blades projects toward the interior of the frame.

Figure 6:
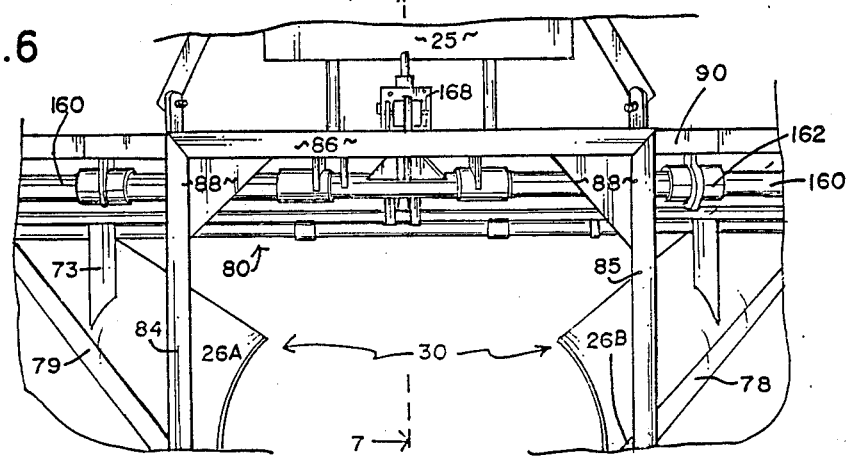
FIG. 6 is an enlarged, fragmentary, rear elevational view of my Levee Squeezer.

As best seen in FIGS. 6, and 9, the rear frame structure 80 comprises a pair of generally vertical post members 84, 85 which are attached at their bottoms to the rear of blades 26A and 26B. Post members 84, 85 extend upwardly to a horizontal strut 86 braced by webs 88. As best seen in FIG. 5, strut 86 is braced at its top by a pair of spaced-apart, horizontal rails 90 which extend back to strut assembly 56 and are welded to pipe 68. Horizontal strut 86 is further braced to pipe 68 by a pair of spaced-apart struts 87 (FIG. 9) which are parallel with axis 59. A pair of similar space-apart bracing struts 89 (FIGS. 6, 9) extend between strut assemblies 56, 58.

Figure 10:
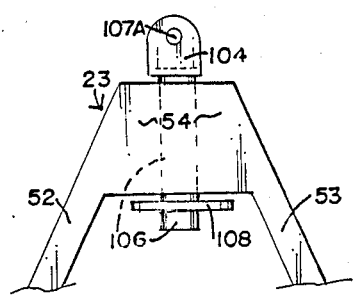
FIG. 10 is an enlarged, fragmentary, partially phantom plan view of the preferred tow bar construction.
Figure 11:
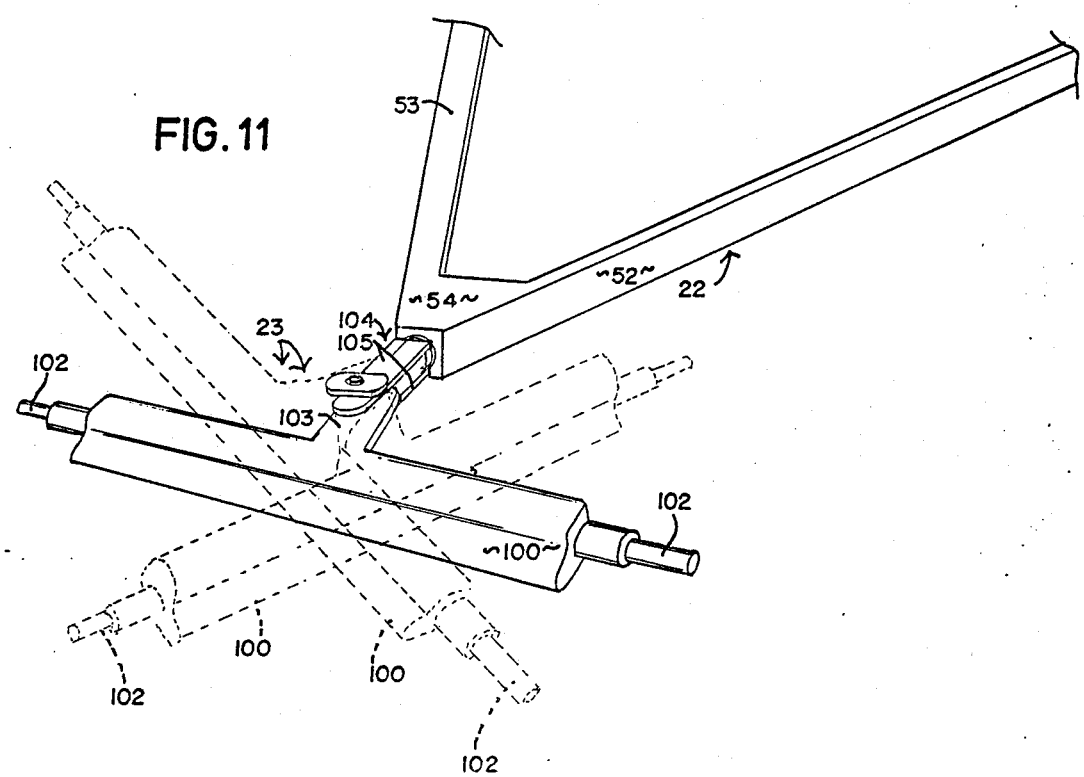
FIG. 11 is an enlarged, fragmentary, frontal perspective view illustrating the preferred tow bar system, with moved positions shown in dashed lines.

With primary attention directed now to FIGS. 9 - 11, the tow bar system has previously been generally designated by the reference numeral 23. Connection is made to the conventional hydraulically operated quick-connect hitch, generally designated by the reference numeral 99 (FIG. 15) on the tractor 24 by snap-fitting the rigid tow bar 100 to the appropriate fittings on the tractor hitch. The elongated, rigid bar 100 terminates in a pair of outwardly projecting shafts 102 for snap-fitting to hitch 99 in a conventional fashion. A rigid, rearwardly projecting tab 103 welded to bar 100 is received by a swiveled coupling 104 between the spaced apart top and bottom plates 105 thereof. Tab 103 may be pinned between the clevis like coupling 104 by a pin 107 (FIG. 14) which penetrates suitable aligned orifices 107A (FIG. 10). Coupling 104 rigidly connects with rotatable shaft 106. As best viewed in FIG. 10, shaft 106 is axially captivated within web 54, and a retainer 108 (FIG. 10) prevents shaft 106 from axially withdrawing from web 54. When the bar 100 is detached after removing pin 107, coupling 104 may be attached directly to a conventional pickup truck or the like.

Thus basic planar, pivotal side-to-side movement is facilitated by pinning tab 103 within coupling 104 (i.e. FIG. 11). Additionally tow bar 100 may be rotated 360 degrees relative to the longitudinal axis 59 (FIG. 9) of the levee squeezer, since shaft 106 is free to rotate. The latter motions enable the tractor to freely maneuver. While the tow bar assembly 23 is thus free to rotate and to pivot side to side, it cannot pivot up-and-down. Thus, when the tow assembly 23 is pressured vertically (i.e. as viewed in FIGS. 14 and 15) the levee squeezer is angled toward or away from the ground. Hence in response to raising or lowering pressure from the hydraulic hitch 99 associated with tractor 24, the entire levee squeezer is variably inclined, as viewed in dashed lines in FIGS. 14 and 15. Thus downward pressure from the tractor will force the cutting blades 26A, 26B into the ground, and sufficient upward motion will tilt the blade leading edges out of the ground. Adjustments to the angle of attack enables the farmer to vary the orientation of the levee squeezer to accommodate soils of different characteristics. In general, lighter soils will enable the blades to be angled deeper into the ground, and the levee may be completed with fewer passes. In heavier gumbo soils the blades will not be forced quite as deep, and an extra pass or two may be necessary. In either case bar ditches will be avoided.

The wheel control system has previously been designated by the reference numeral 34. With primary attention now directed to FIGS. 5, 10, 12 and 13, the wheel system 34 is hydraulically powered, and it can move a pair of spaced apart conventional agricultural wheels 120 into contact with the ground. When the wheels are lowered, the machine rises. When forced downwardly all the way, the levee squeezer is deployed in a transportable position. It may be locked in this position so that hydraulic pressure is not necessary when being towed over a road, for example, to a field for use. When released the wheels assume a generally out-of-the-way levee cutting position, which will hereinafter be described.

The wheel control system comprises an elongated, rigid, transverse wheel control axis 122 (FIG. 13) which extends transversely across the frame. As best viewed in FIG. 12, axle 122 is journaled through suitable frame mandrels which extend rearwardly downwardly from the frame. Axle 122 can be rotated by an axle lever 124. Lever 124 is controlled by hydraulic wheel cylinder 127 which extends between the lever and a support 126 secured upon a transverse plate 128 extending between bracing struts 89 (FIG. 13). The wheels are controlled by a pair of angularly rearwardly projecting wheel control arms 130 which extend from the opposite ends of the wheel control axle 122 and are coupled via suitable bearings to conventional wheels 120. Hence when cylinders 127 is retracted, the wheels 120 are forced toward the ground, and when cylinder 127 is fully extended the wheels are lifted away from the ground and the frame is thus lowered.

When cylinder 127 causes rotation of the wheel control axle 122 a follower 138 (FIGS. 12, 13) will be moved concurrently with lever 124. Follower 138 is operationally sandwiched between a pair of rigid, downwardly extending braces 140 (FIG. 13) vertically extending between upper and lower rails 60, 61 of strut assembly 58 previously described. Follower 138 includes an orifice 143 (FIG. 13) which will be positioned either in front of or in back of braces 140, depending upon the desired wheel deployment. After the wheels are forced downwardly, strut 138 may be pinned by the application of a suitable steel pin through orifice 143 (FIG. 13), and the levee squeezer may be freely transported by a pickup truck or the like even without hydraulically powering ram 127, since upward rear wheel pressure cannot force strut 128 back into extending members 140. Of course the wheels are not usually locked into a clearance position during levee cutting, since they are pressured hydraulically to adjust the angle of attack of the blades, in conjunction with inclination adjustments to the towing system previously described.

Turning now to FIGS. 5–9, and 12, an associated tine control system has previously been designated by the reference numeral 36. The tine control system 36 extends rearwardly outwardly from frame for selective engagement with the ground. By rigidly manipulating the tine system, bar ditches 44 (FIG. 3) are avoided.

Figure 7:
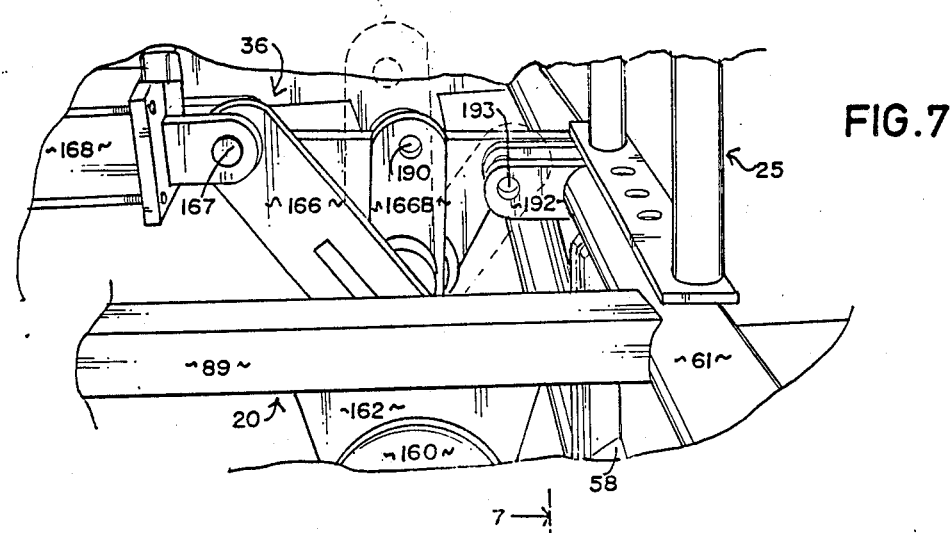
FIG. 7 is an enlarged, fragmentary, perspective view of the tine control system, taken generally adjacent line 7—7 of FIG. 6.
Figure 12:
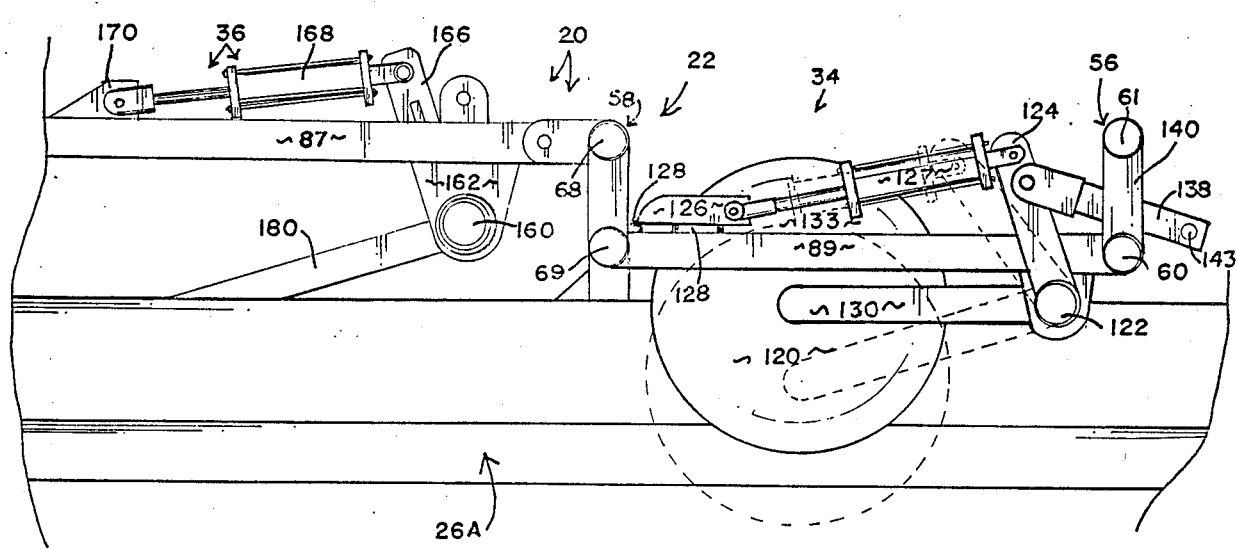
FIG. 12 is an enlarged, fragmentary, sectional view taken generally along line 12—12 of FIG. 9, with portions thereof broken away for clarity or omitted for brevity.

Rotatable tine control axle 160 transversely extends across and beneath the frame rear. As in the case of the wheel control system, the tine control axle 160 is journaled through suitable mandrels 162, extending downwardly from the frame (FIGS. 6, 12). A rigid rotatable lever 166 is welded to tine control axle 160, and it is coupled to a tine control cylinder 168 by a suitable pin 167 (FIG. 7). Cylinder 168 is coupled to the frame at rear tab 170. It will thus be apparent that the tine control axle 160 can be rotated at will by the cylinder 168. A pair of angularly spaced-apart and rearwardly projecting tine bar struts 180 (FIGS. 5, 9 and 12) extend from opposite ends of the tine control axle 160, and angularly extend away from the frame. Tine control struts 180 perpendicularly terminate in rigid, elongated tine bars 182. Each of the tine bars 182 mounts a plurality (preferably five) of rigid, resilient downwardly projecting Danish tines 184 which forcibly engage the ground.

As the tine control axle 160 is rotated by hydraulic cylinder 168, the tines 184 are ultimately forced into or out of the ground as the tine bars 182 are moved by the tine control struts 180. When cylinder 168 is contracted, tines 184 are forced into the ground. When cylinder 168 is extended the tines clear the ground. When the levee squeezer is to be transported over level road, perhaps by pickup truck as previously explained, the tines may be locked into an out-of-the-way position. In the best mode, for maximum frame strength, cylinders 168 and 127 are coplanar.

With primary reference directed to FIG. 7, tine control locking is effectuated by a locking follower 166B which projects from the tine control axle 160. It comprises an orifice 190 adapted to be aligned within a shackle 192 projecting from the frame strut assembly 58. When orifice 190 and 193 are pinned together by a suitable steel pin, the tines will be maintained in the transport position of FIG. 8, where they are permenantly locked into an up and out of the way position.

As viewed in FIG. 9, tine control struts 180 form an acute angle 200 of approximately eighteen to twenty two degrees with the longitudinal axis 59 of the frame. In the best mode angle 200 is twenty degrees. As mentioned the tine bars 182 are disposed perpendicularly to the tine control struts 180, and they form an angle of approximately seventy degrees with the axis 58. The latter angle is complementary to angle 200, with which it may vary proportionately.

In the best mode frame rails 52, 53 and blades 26A, 26B are parallel with the tine control struts 180. The cutting blades 26A and 26B are oriented at an angle of between twenty to twenty six degrees with respect to the axis 59. In the best mode the blades are angled at approximately twenty-three degrees, and they are each approximately fourteen to sixteen inches in width.

A gap 204 results between the innermost ends of the tine bars 182 immediately adjacent output 30 defined at the upper part of the blades (FIG. 9). Nominally gap 204 is three feet. A space 205, approximately ten to fourteen inches, exists between the tine bar ends and the output mouth 30 of the cutting blades 26A and 26B.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A levee squeezer for rice farming comprising:
   a rigid frame adapted to be coupled to a tow vehicle such as a tractor, said frame having a front, a rear, a top, and a longitudinal axis;
   a tow bar coupled to said frame for attaching said levee squeezer to said tow vehicle;
   first and second levee squeezing blades secured beneath said frame and extending generally from said frame front to said frame rear in a "V" configuration, said blades forming a wide mouth at the frame front and converging to a narrower levee discharge output beneath the frame rear;
   a wheel system secured to said frame deployable in a first position to transport said squeezer over a road to a field and in a second out-of-the way position for making levees;
   first hydraulic means for selectively activating said wheel system;
   a bar ditch reduction tine system for controlling levee ruts created by said blades, said tine system comprising a pair of spaced-apart tine bars having tines adapted to be forced into the ground during levee construction, a transverse tine control axle journalled to said frame, and a pair of tine bar struts extending rearwardly from said tine control axle rearwardly diverging from each other and secured generally perpendicularly to said tine bars; and,
   second hydraulic means for selectively vertically positioning said tine system.

2. The levee squeezer as defined in claim 1 wherein said tine bar struts each form an acute angle of approximately twenty degrees with the longitudinal axis of said frame.

3. The levee squeezer as defined in claim 2 wherein said blades each form an acute angle of approximately twenty to twenty-five degrees with said frame longitudinal axis.

4. The levee squeezer as defined in claim 3 wherein said tine system includes a mechanical tine locking system for selectively securing said tine axle against rotation.

5. The levee squeezer as defined in claim 8 wherein said wheel system includes a lock for mechanically maintaining it in the transport position.

6. The levee squeezer as defined in claim 2 wherein said frame comprises a pair of rearwardly diverging rails, and said tine bar struts are generally parallel with and spaced apart from said last mentioned rails.

7. A levee squeezer for rice farming comprising:
 a rigid frame adapted to be coupled to a tow vehicle such as a tractor, said frame having a front, a rear, and a longitudinal axis;
 a tow bar coupled to said frame for attaching said levee squeezer to a quick hitch associated with said tow vehicle, said tow bar rotatable relative to said longitudinal axis and angularly pivotal from side to side facilitating maneuvering of said tractor on uneven terrain;
 first and second, rigid, fixed, levee squeezing blades for engaging the ground to form a levee, said blades secured beneath said frame and extending generally from said frame front to said frame rear in a "V" configuration, said blades forming a wide mouth to the frame front and converging at a narrower levee discharge output beneath the frame rear;
 a wheel system secured to said frame deployable in a first position to transport said squeezer to a field and in a second out-of-the way position for making levees;
 first hydraulic means for selectively activating said wheel system facilitating proper road clearance for towing said squeezer;
 a bar ditch reduction tine system for controlling levee ruts created by said blades, said tine system comprising a pair of spaced-apart tine bars equipped with a plurality of rigid, downwardly projecting tines forced into the ground during levee construction, a transverse tine control axle journalled to said frame, and a pair of tine bar struts extending rearwardly from said tine control axle rearwardly diverging from each other and secured generally perpendicularly to said tine bars; and,
 second hydraulic means for selectively actuating said tine system.

8. The levee squeezer as defined in claim 7 wherein said tine bar struts each form an acute angle of approximately 20 degrees with reference to said longitudinal axis of said frame.

9. The levee squeezer as defined in claim 8 wherein said frame comprises a pair of rearwardly diverging rails, and said tine bar struts are generally parallel with and spaced apart from said last mentioned rails.

10. The levee squeezer as defined in claim 9 wherein said tine system includes a mechanical tine locking system for securing said tine control axle against rotation.

11. The levee squeezer as defined in claim 10 wherein said wheel system includes a lock for mechanically maintaining it in the transport position.

12. The levee squeezer as defined in claim 11 wherein said first and second hydraulic means are coplanar with one another to facilitate frame stability.

13. A levee squeezer for rice farming comprising:
 a rigid frame adapted to be coupled to a tow vehicle such as a tractor, said frame having a front, a rear, a pair of rearwardly diverging rails, and a longitudinal axis;
 a tow bar coupled to said frame for attaching said levee squeezer to a quick hitch associated with said tow vehicle, said tow bar rotatable about said longitudinal axis and angularly pivotal from side to side facilitating maneuvering of said tractor on uneven terrain;
 first and second, rigid, fixed, levee squeezing blades for engaging the ground to form a levee, said blades secured beneath said frame and extending generally from said frame front to said frame rear in a "V" configuration, said blades forming a wide mouth at the frame front and converging at a narrower levee discharge output beneath the frame rear;
 a wheel system secured to said frame deployable in a first position to transport said squeezer to a field and in a second out-of-the way position for making levees, said wheel system including a lock for mechanically maintaining it in a transport position;
 first hydraulic means for selectively activating said wheel system facilitating proper road clearance for towing said squeezer;
 a tine system for controlling levee ruts created by said blades, said system comprising a pair of spaced-apart tine bars equipped with a plurality of rigid, downwardly projecting tines forced into the ground during levee construction, a transverse tine control axle journalled to said frame, and a pair of the bar struts extending rearwardly from said tine control axle rearwardly diverging from each other and secured perpendicularly to said tine bars, said tine bar struts being generally parallel with and spaced apart from said frame rails, said tine system including a mechanical tine locking system for securing said tine axle against rotation; and
 second hydraulic means for selectively vertically positioning said tine system, said first and second hydraulic means being coplanar with one another to facilitate frame stability.

14. The levee squeezer as defined in claim 13 wherein said tine bar struts each form an acute angle of approximately 20 degrees with reference to said longitudinal axis of said frame.

* * * * *